United States Patent
Lee et al.

(10) Patent No.: US 9,049,465 B2
(45) Date of Patent: Jun. 2, 2015

(54) MEDIA SHARING APPARATUS AND METHOD

(75) Inventors: Hyun-Jeong Lee, Daejeon (KR); Jae-Doo Huh, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 79 days.

(21) Appl. No.: 13/600,960

(22) Filed: Aug. 31, 2012

(65) Prior Publication Data
US 2013/0061270 A1    Mar. 7, 2013

(30) Foreign Application Priority Data

Sep. 2, 2011   (KR) .......................... 10-2011-0089152
Dec. 15, 2011  (KR) .......................... 10-2011-0135847

(51) Int. Cl.
H04N 7/20       (2006.01)
H04N 21/2343    (2011.01)
H04N 21/258     (2011.01)
H04N 21/2662    (2011.01)
H04N 21/658     (2011.01)

(52) U.S. Cl.
CPC ............ *H04N 21/234309* (2013.01); *H04N 21/234354* (2013.01); *H04N 21/234363* (2013.01); *H04N 21/25825* (2013.01); *H04N 21/25833* (2013.01); *H04N 21/2662* (2013.01); *H04N 21/6582* (2013.01)

(58) Field of Classification Search
CPC ............ H04N 21/25833; H04N 21/2662; H04N 21/6582; H04N 21/234309; H04N 21/234354; H04N 21/234363; H04N 21/25825
USPC .......................................... 725/62
See application file for complete search history.

(56) References Cited

U.S. PATENT DOCUMENTS

| | | | |
|---|---|---|---|
| 6,769,127 B1* | 7/2004 | Bonomi et al. | 725/39 |
| 6,981,045 B1* | 12/2005 | Brooks | 709/226 |
| 7,801,847 B2* | 9/2010 | Kiilerich et al. | 707/609 |
| 2004/0226048 A1* | 11/2004 | Alpert et al. | 725/109 |
| 2005/0135285 A1* | 6/2005 | Vlot | 370/310 |
| 2005/0138192 A1* | 6/2005 | Encarnacion et al. | 709/230 |

(Continued)

FOREIGN PATENT DOCUMENTS

| KR | 1020070059887 | 6/2007 |
|---|---|---|
| KR | 1020100139108 | 12/2010 |
| KR | 1020110034963 | 4/2011 |

*Primary Examiner* — Nasser Goodarzi
*Assistant Examiner* — Michael B Pierorazio
(74) *Attorney, Agent, or Firm* — Nelson Mullins Riley & Scarborough LLP; Anthony A. Laurentano, Esq.

(57) ABSTRACT

The media sharing apparatus includes a terminal information management unit for, when a media playing terminal is connected thereto, requesting profile information from the connected media playing terminal and managing profile information received from the media playing terminal. A media information management unit determines based on the profile information whether to convert media data to be provided to the media playing terminal, and ascertains media conversion information suitable for a type of the media playing terminal. A media conversion unit converts the media data into data suitable for the type of the media playing terminal depending on a result of the determination. A data processing unit provides either media data suitable for the type of the media playing terminal among pieces of pre-stored media data, or media data converted by the media conversion unit, to the media playing terminal.

13 Claims, 5 Drawing Sheets

(56) References Cited

U.S. PATENT DOCUMENTS

| | | | |
|---|---|---|---|
| 2006/0161635 A1* | 7/2006 | Lamkin et al. | 709/217 |
| 2007/0033533 A1* | 2/2007 | Sull | 715/752 |
| 2007/0157260 A1* | 7/2007 | Walker | 725/86 |
| 2007/0226238 A1* | 9/2007 | Kiilerich et al. | 707/101 |
| 2008/0208607 A1* | 8/2008 | Ma et al. | 705/1 |
| 2008/0235733 A1* | 9/2008 | Heie et al. | 725/46 |
| 2009/0275403 A1* | 11/2009 | Proctor | 463/29 |
| 2010/0031299 A1* | 2/2010 | Harrang et al. | 725/80 |
| 2010/0070628 A1* | 3/2010 | Harrang et al. | 709/224 |
| 2010/0131385 A1* | 5/2010 | Harrang et al. | 705/26 |
| 2010/0198943 A1* | 8/2010 | Harrang et al. | 709/217 |
| 2010/0299708 A1* | 11/2010 | Xu et al. | 725/54 |
| 2011/0106910 A1* | 5/2011 | Grasset | 709/217 |
| 2011/0131319 A1* | 6/2011 | Harrang et al. | 709/224 |
| 2011/0191446 A1* | 8/2011 | Dazzi et al. | 709/219 |
| 2011/0255555 A1* | 10/2011 | Alexander | 370/468 |
| 2011/0264817 A1* | 10/2011 | Raveendran | 709/230 |
| 2012/0254913 A1* | 10/2012 | Di Mattia et al. | 725/34 |

* cited by examiner

MEDIA SHARING APPARATUS AND METHOD

CROSS REFERENCE TO RELATED APPLICATIONS

This application claims the benefit of Korean Patent Application Nos. 10-2011-0089152, filed on Sep. 2, 2011 and 10-2011-0135847, filed on Dec. 15, 2011, which are hereby incorporated by reference in their entirety into this application.

BACKGROUND OF THE INVENTION

1. Technical Field

The present invention relates generally to a media sharing apparatus and method and, more particularly, to a media sharing apparatus and method, which enable previously converted media to be shared among homogeneous terminals when converting the attributes of media, such as a file format, a video codec, or an audio codec, to fit the characteristics of a media playing terminal.

2. Description of the Related Art

Recently, with the remarkable development of mobile terminals, a variety of mobile terminals have appeared and been used. Due to the appearance of the iPhone, the field of the mobile terminal has entered a new phase.

However, this variety of mobile terminals all have different hardware qualities such as size, resolution, and the color level of the screens mounted thereon and computer system abilities, and different software characteristics such as supported codecs and installed media players, so that media compatibility between terminals is very low.

In this situation, there frequently occurs the case of media not being played because a terminal does not support a codec when a user utilizes media. That is, due to the hardware and software characteristics of respective mobile terminals and the characteristics of players or the like installed on the mobile terminals, the type of a supported codec differs, and then each terminal does not support the playing of all types of media.

For example, there occurs the case where videos playable on mobile terminals that use Microsoft's Windows mobile Operating System (OS) cannot be played on Apple iPhone terminals. In this case, when the playing of videos is attempted, a message indicative of "unsupported codec" may be displayed. Some codecs may be downloaded over the Internet and then installed, but some codecs may not even be supported.

To cope with this situation, a media conversion method is required and, in particular, a method of sharing media among homogeneous terminals has been required so as to improve the efficiency of media conversion and increase the use rate of a Central Processing Unit (CPU).

SUMMARY OF THE INVENTION

Accordingly, the present invention has been made keeping in mind the above problems occurring in the prior art, and an object of the present invention is to provide a media sharing apparatus and method, which enable previously converted media to be shared among homogeneous terminals when converting the attributes of media, such as a file format, a video codec, or an audio codec, to fit the characteristics of a media playing terminal, thus optimizing the conversion efficiency and use rate of media data.

In accordance with an aspect of the present invention to accomplish the above object, there is provided a media sharing apparatus including a terminal information management unit for, when a media playing terminal is connected thereto, requesting profile information from the connected media playing terminal and managing profile information received from the media playing terminal, a media information management unit for determining based on the profile information of the media playing terminal whether to convert media data to be provided to the media playing terminal, and ascertaining media conversion information suitable for a type of the media playing terminal, a media conversion unit for converting the media data into data suitable for the type of the media playing terminal depending on a result of the determination by the media information management unit, and a data processing unit for providing either media data suitable for the type of the media playing terminal among pieces of pre-stored media data, or media data converted by the media conversion unit, to the media playing terminal.

Preferably, the media information management unit may be configured to, if it is determined that the media data to be provided to the media playing terminal requires data conversion, perform a search to determine based on the media conversion information whether the media data suitable for the type of the media playing terminal or source media data is present among the pieces of pre-stored media data.

Preferably, the data processing unit may be configured to, if neither media data suitable for the type of the media playing terminal nor source media data is present among the pieces of pre-stored media data, request media data from a service providing server that provides a media data service.

Preferably, the media information management unit may verify whether the media data suitable for the type of the media playing terminal is of a type that is convertible by the media sharing apparatus.

Preferably, the data processing unit may be configured to, if it is verified by the media information management unit that the media data suitable for the type of the media playing terminal is not of the type that is convertible by the media sharing apparatus, generate a media transmission denial message and send the media transmission denial message to the media playing terminal.

Preferably, the data processing unit may be configured to, if it is determined by the media information management unit that the media data to be provided to the media playing terminal does not require data conversion, provide information of a service providing server that provides a media data service to the media playing terminal.

Preferably, the profile information may include at least one of screen size information of the media playing terminal, network information such as a bandwidth and a protocol of the media playing terminal, video information, audio information, and file format and resolution information of the media data.

In accordance with an aspect of the present invention to accomplish the above object, there is provided a media sharing method including, when a media playing terminal is connected, requesting profile information from the connected media playing terminal, determining based on the profile information of the media playing terminal whether to convert media data, and ascertaining media conversion information suitable for a type of the media playing terminal if conversion of the media data is required, and providing, based on the media conversion information, either media data suitable for the type of the media playing terminal among pieces of pre-stored media data, or media data converted into a type of data suitable for the type of the media playing terminal, to the media playing terminal.

Preferably, the media sharing method may further include performing a search to determine whether the media data suitable for the type of the media playing terminal or source media data is present among the pieces of pre-stored media data, based on the media conversion information at the ascertaining the media conversion information.

Preferably, the media sharing method may further include, if media data suitable for the type of the media playing terminal is not present among the pieces of pre-stored media data, but conversion of media data suitable for the media playing terminal is possible, verifying whether source media data is present.

Preferably, the media sharing method may further include, if it is verified that the source media data is not present, requesting source media data from a service providing server that provides a media data. Thereafter, media conversion for the media playing terminal is performed.

Preferably, the media sharing method may further include, if the pre-stored source media data is present, converting the source media data into data suitable for the media playing terminal.

Preferably, the media sharing method may further include converting at least one of the pre-stored media data and media data provided by a service providing server that provides a media data service into a type of data suitable for the type of the media playing terminal, based on the media conversion information at the ascertaining the media conversion information.

Preferably, the ascertaining the media conversion information may include verifying whether the media data suitable for the type of the media playing terminal is of a type that is convertible by a relevant media sharing apparatus.

Preferably, the media sharing method may further include, if it is verified that the media data suitable for the type of the media playing terminal is not of the type that is convertible by the media sharing apparatus, generating a media transmission denial message and sending the media transmission denial message to the media playing terminal.

Preferably, the media sharing method may further include before the providing the media data, if it is determined that the media data to be provided to the media playing terminal does not require data conversion, providing information of a service providing server that provides a media data service to the media playing terminal.

Preferably, the profile information may include at least one of screen size information of the media playing terminal, network information such as a bandwidth and a protocol of the media playing terminal, video information, audio information, and file format and resolution information of the media data.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described with reference to the attached drawings.

Figure 1:
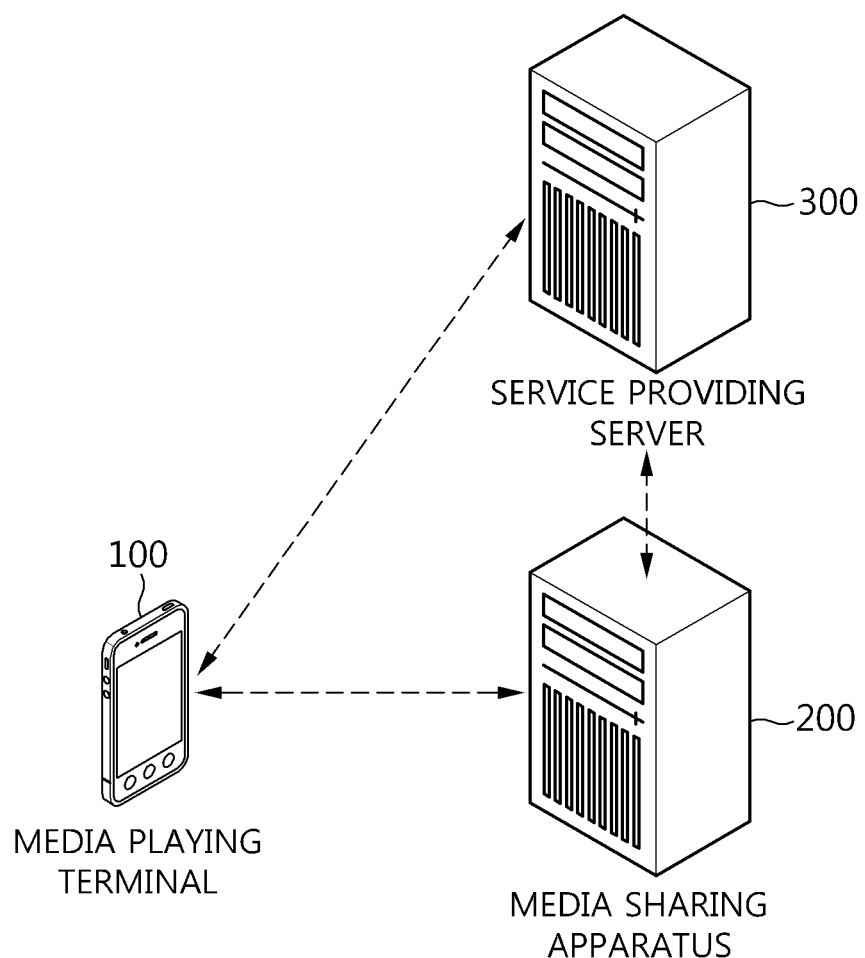
FIG. 1 is a diagram showing the configuration of a system to which a media sharing apparatus according to the present invention is applied.

FIG. 1 is a diagram showing the configuration of a system to which a media sharing apparatus according to the present invention is applied.

As shown in FIG. 1, the system to which the media sharing apparatus according to the present invention includes a media playing terminal 100, a service providing server 300, and a media sharing apparatus 200.

The media playing terminal 100 accesses the media sharing apparatus 200, requests media data from the media sharing apparatus 200, and plays the media data shared by the media sharing apparatus 200. All terminals provided with a media player may correspond to the media playing terminal 100.

When the media playing terminal 100 is a terminal that does not require the conversion of media data, the media playing terminal 100 may access the service providing server 300 that provides a media data service and then be directly provided with media data.

The media sharing apparatus 200 is an agent device disposed between the media playing terminal 100 and a service terminal for providing a media data service and configured to provide converted media data to the media playing terminal 100 that requires the conversion of media data.

The media sharing apparatus 200 may share and store media data suitable for the type of a relevant media playing terminal 100, among pieces of pre-stored media data, at the request of the media playing terminal 100, or may be provided with media data from the service providing server 300, convert the media data into data suitable for the type of the media playing terminal 100 and provide the converted data as media data.

In this case, the media sharing apparatus 200 requests profile information from the media playing terminal 100 when the media playing terminal 100 is connected thereto, and ascertains the type of media data suitable for the type of the relevant media playing terminal 100 on the basis of received profile information.

In relation to this operation, the detailed configuration of the media sharing apparatus 200 will be described with reference to FIG. 2.

Figure 2:
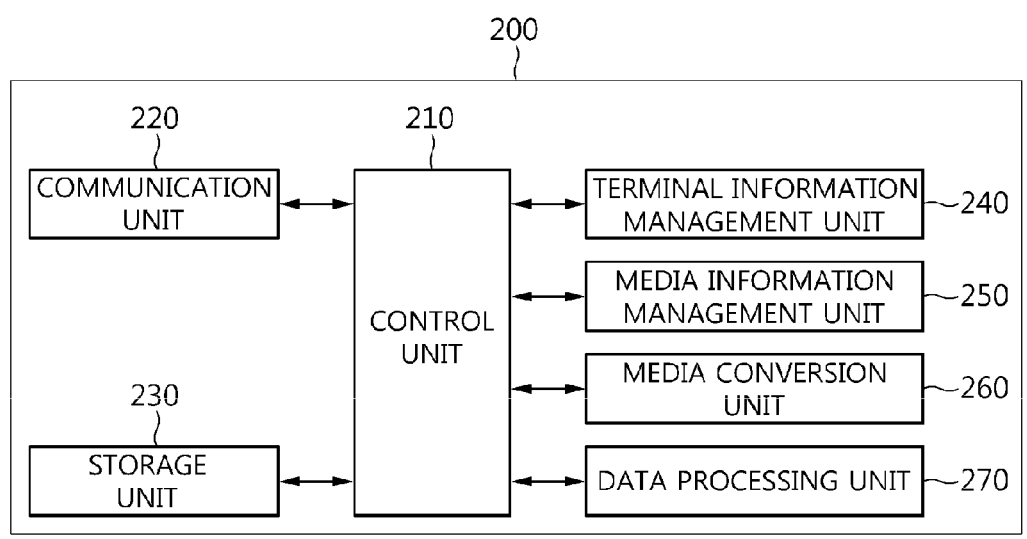
FIG. 2 is a block diagram showing the configuration of the media sharing apparatus according to the present invention.

FIG. 2 is a block diagram showing the configuration of the media sharing apparatus according to the present invention.

As shown in FIG. 2, a media sharing apparatus 200 according to the present invention includes a control unit 210, a communication unit 220, a storage unit 230, a terminal information management unit 240, a media information management unit 250, a media conversion unit 260, and a data processing unit 270. The control unit 210 controls the operation of individual units of the media sharing apparatus 200.

The communication unit 220 provides a communication interface for communicating with a media playing terminal and a service providing server.

The storage unit 230 stores data set by the media sharing apparatus 200, and also stores media data or the like converted by the media sharing apparatus 200. Further, the storage unit 230 may store the information of a media playing terminal connected to the media sharing apparatus 200 via the communication unit 220, for example, the profile information of the media playing terminal.

The terminal information management unit 240 requests profile information from a connected media playing terminal when the media playing terminal is connected via the communication unit 220. Further, the terminal information management unit 240 stores the profile information, received from the connected media playing terminal, in the storage unit 230, and manages the stored profile information.

Here, the profile information of the media playing terminal includes information about the hardware and software of the relevant media playing terminal and an execution engine required to execute media.

For example, the profile information of the media playing terminal may include the screen size information of the media playing terminal, network information such as the bandwidth and protocol (for example, a Transmission Control Protocol (TCP), a User Datagram Protocol (UDP), a Real Time Streaming Protocol (RTSP), a Hypertext Transfer Protocol (HTTP), etc.) of the media playing terminal, video and audio information, the file format and resolution information of input/output media, etc.

The media information management unit 250 determines whether to convert media data to be provided to the media playing terminal, based on the profile information of the media playing terminal.

Further, when a media playing terminal requires the conversion of media data, the media information management unit 250 ascertains media conversion information suitable for the type of the media playing terminal on the basis of the profile information of the media playing terminal. That is, the media information management unit 250 detects the screen size information, the network information such as the bandwidth and protocol (TCP, UDP, RTSP or HTTP), the video and audio information, the file format and resolution information of input/output media, etc., in the profile information of the media playing terminal, and then ascertains media conversion information suitable for the type of the media playing terminal.

Meanwhile, the media information management unit 250 verifies based on the media conversion information whether the media data suitable for the type of the media playing terminal is of a type that is convertible by the media sharing apparatus 200.

For example, the media information management unit 250 compares the attribute information of the media playing terminal with the attribute information of media data that is convertible by the media sharing apparatus 200 and then verifies whether media data is convertible into a type of media data that is suitable for the type of the media playing terminal.

Attributes such as a bandwidth, frame rate, screen size, protocol, file format, encoder, decoder, and resolution, are applied to the rules for comparing pieces of attribute information of the media playing terminal and media data. In detail, rules for using a comparison to determine whether media data falls within the range supported by the media playing terminal are applied to the bandwidth, frame rate, and screen size among the above attributes. Rules for using a comparison to determine whether there is an intersection between the attributes of the media playing terminal and the media data are applied to the protocol, file format, encoder, decoder, and resolution among the above attributes.

In this case, when the media data suitable for the type of the media playing terminal is of a type that is convertible by the media sharing apparatus 200, the media information management unit 250 performs a search to determine based on media conversion information whether media data suitable for the type of the media playing terminal is present in media data pre-stored in the storage unit 230.

When the media playing terminal requires the conversion of media data, the media conversion unit 260 converts the media data into data suitable for the type of the media playing terminal, on the basis of media conversion information ascertained by the media information management unit 250.

In this case, the media conversion unit 260 converts video attributes such as the file format, video codec, video mode, video bit rate, video frame rate, video resolution, and video ratio of media data, and audio attributes such as the audio codec, audio sample rate, audio bit rate, and audio channel of the media data into a type of attributes suitable for the media playing terminal.

If media data found by the media information management unit 250 is present, that is, if media data suitable for the type of the media playing terminal is pre-stored in the media storage unit 230, the data processing unit 270 provides the relevant media data to the connected media playing terminal. Therefore, the media sharing apparatus 200 provides the media data to the media playing terminal without requiring a separate data conversion procedure, and the media playing terminal can be provided with the media data within a short period of time.

In contrast, if the media data found by the media information management unit 250 is not present, that is, if media data suitable for the type of the media playing terminal is not pre-stored in the storage unit 230, the data processing unit 270 accesses the service providing server which provides the media data service, and then requests media data from the service providing server.

When source media data is present in the storage unit 230, the data processing unit 270 may call media data stored in the storage unit 230 and provide the media data to the media conversion unit 260 without requesting separate media data from the service providing server.

In this case, the media conversion unit 260 converts the media data provided by the service providing server or the source media data stored in the storage unit 230 into a type of data suitable for the type of the media playing terminal, on the basis of the previously ascertained media conversion information. Further, the data processing unit 270 provides the media data, which has been converted into the data suitable for the type of the media playing terminal by the media conversion unit 260, to the media playing terminal.

Meanwhile, if it is verified that the media data suitable for the type of the media playing terminal is not of the type that is convertible by the media sharing apparatus 200 on the basis of the media conversion information ascertained by the media information management unit 250, the data processing unit 270 generates a media transmission denial message and sends it to the media playing terminal.

Further, if it is determined by the media information management unit 250 that media data to be provided to the media playing terminal does not require data conversion, the data processing unit 270 provides the information of the service providing server, which provides the media data service, to the media playing terminal. Therefore, the media playing terminal may access the service providing server based on the information of the service providing server provided by the media sharing apparatus 200, and may then be directly provided with the media data service from the service providing server.

Figure 3:
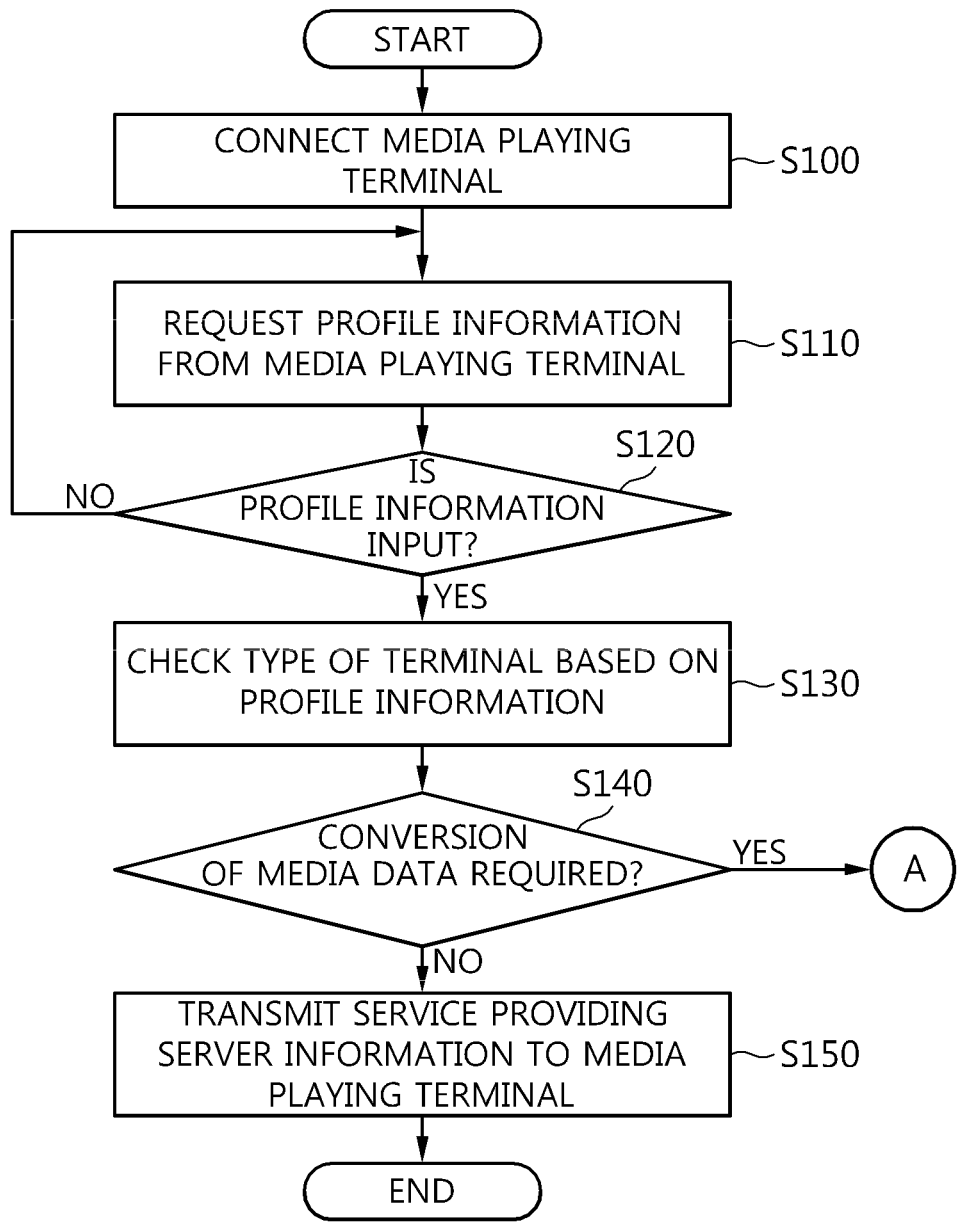
FIGS. 3 to 5 are flowcharts showing the operating flow of a media sharing method according to the present invention.
Figure 4:
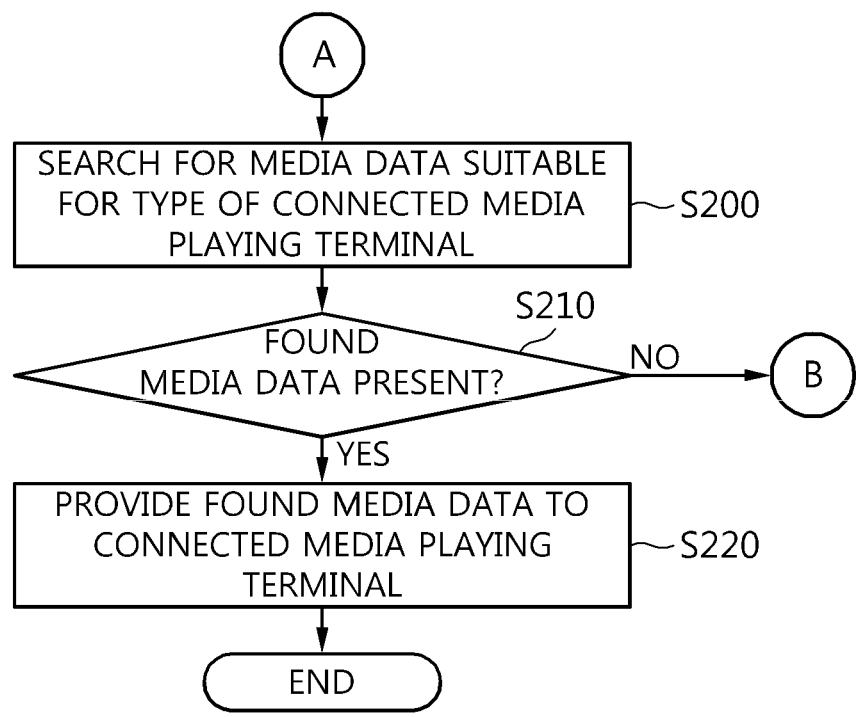
Figure 5:
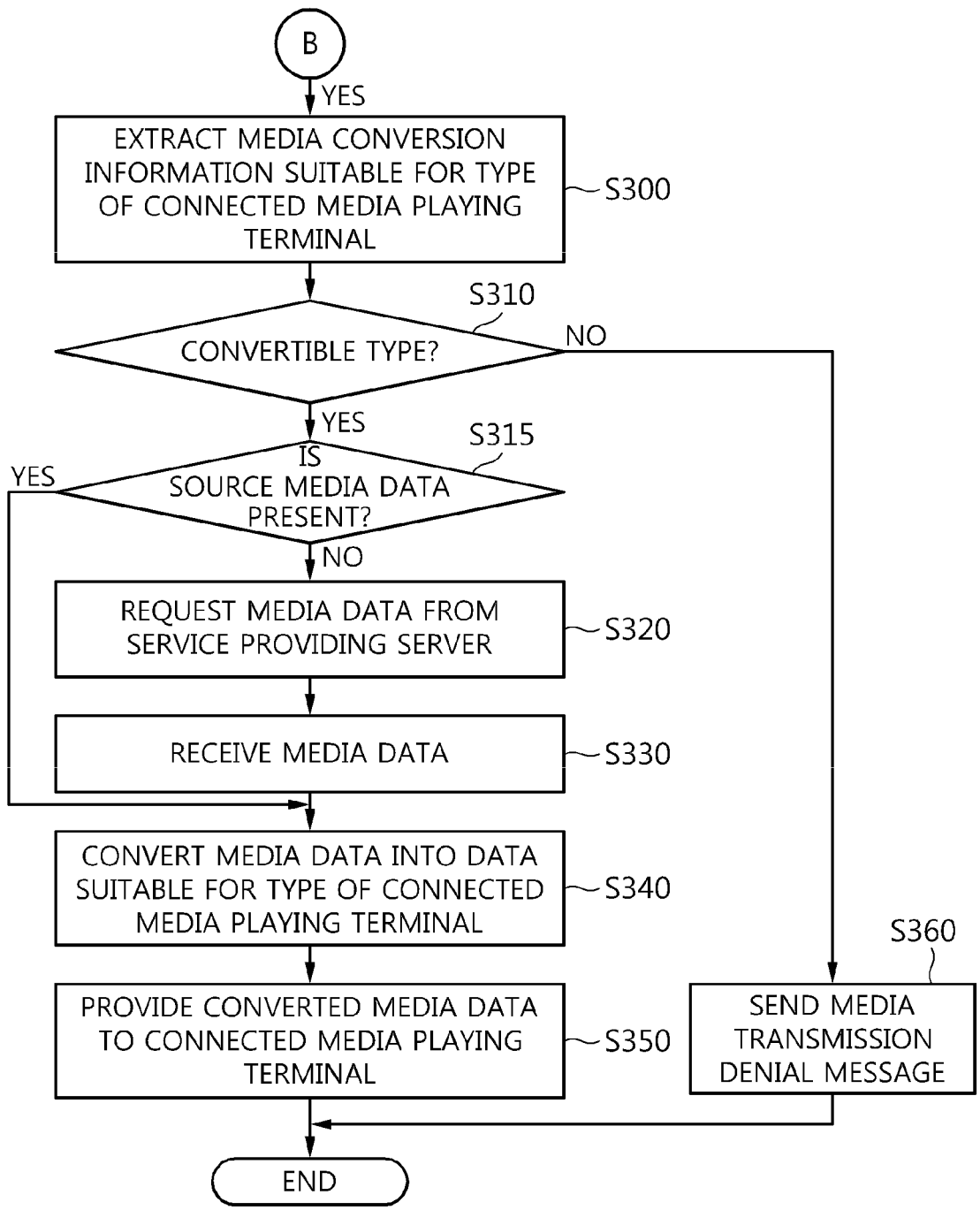

FIGS. 3 to 5 are flowcharts showing the operating flow of a media sharing method according to the present invention.

As shown in FIG. 3, when a media playing terminal is connected to the media sharing apparatus at step S100, the media sharing apparatus requests profile information from the connected media playing terminal at step S110. Here, the profile information of the media playing terminal includes at least one of the screen size information of the media playing terminal, network information such as the bandwidth and protocol (TCP, UDP, RTSP or HTTP) of the media playing terminal, video and audio information, and the file format and resolution information of input/output media.

Thereafter, when the profile information is input from the connected media playing terminal at step S120, the media sharing apparatus checks the type of the media playing terminal based on the profile information of the media playing terminal at step S130. In this case, if it is determined at step S140 that the conversion of media data is not required based on the type of the media playing terminal checked at step S130, the media sharing apparatus transmits the information of a service providing server, which provides a media data service, to the media playing terminal at step S150.

Therefore, the media playing terminal directly accesses the service providing server on the basis of the information of the service providing server provided at step S150, and is then provided with the media data service.

Meanwhile, if it is determined at step S140 that the conversion of media data is required based on the type of the media playing terminal checked at step S130, the media sharing apparatus performs a procedure after 'A' in FIG. 4.

In detail, if the media playing terminal requires the conversion of media data, the media sharing apparatus ascertains media conversion information suitable for the type of the media playing terminal on the basis of the profile information of the media playing terminal, and performs a search to determine based on the media conversion information whether media data suitable for the type of the media playing terminal is present among pieces of media data pre-stored in the storage unit 230 at step S200, as shown in FIG. 4.

If found media data is present among the pieces of pre-stored media data at step S210, the media sharing apparatus provides the media data found at step S200 to the media playing terminal at step S220.

In this case, since the media sharing apparatus can directly provide the media data to the media playing terminal without requiring a separate media data conversion procedure, the conversion efficiency of media can be improved while the media playing terminal can be promptly provided with the media data.

Meanwhile, if found media data is not present among the pieces of pre-stored data at step S210, the media sharing apparatus performs a procedure after 'B' in FIG. 5.

In detail, if media data suitable for the type of the media playing terminal is not present among the pieces of pre-stored media data, the media sharing apparatus converts the media data into a type of data suitable for the type of the media playing terminal, and provides the resulting data to the media playing terminal.

In this case, as shown in FIG. 5, the media sharing apparatus extracts media conversion information suitable for the type of the media playing terminal on the basis of the profile information of the media playing terminal at step S300, and verifies whether the extracted media conversion information is of a type that is convertible by the media sharing apparatus.

The media sharing apparatus compares the attribute information of the media playing terminal with the attribute information of the media data, and then verifies whether the media conversion information is of the type that is convertible by the media sharing apparatus. In more detail, the media sharing apparatus uses a comparison to determine whether the bandwidth, frame rate and screen size of media data that is convertible by the media sharing apparatus fall within the range supported by the media playing terminal, and also uses a comparison to determine whether there is an intersection between the attributes of the media playing terminal and the media data, with respect to the protocol, file format, encoder, decoder, and resolution.

If the media conversion information extracted at step S300 is of the type that is convertible by the media sharing apparatus at step S310, the media sharing apparatus verifies whether source media data is present therein at step S315. If it is verified that the source media data is not present in the media sharing apparatus, the media sharing apparatus requests the source media data from the service providing server at step S320.

When the media data is received from the service providing server at step S330, the media sharing apparatus converts the received media data into data suitable for the type of the media playing terminal on the basis of the media conversion information, extracted at step S300, at step S340, and provides the converted media data obtained at step S340 to the connected media playing terminal at step S350.

Meanwhile, if it is verified at step S315 that source media data is present in the media sharing apparatus, the media sharing apparatus may also convert the media data stored in the media sharing apparatus and provide the converted media data to the media playing terminal by performing steps S340 and S350 using the source media data.

In this case, step S340 is configured to convert video attributes such as the file format, video codec, video mode, video bit rate, video frame rate, video resolution and video ratio of the media data, and audio attributes such as the audio codec, audio sample rate, audio bit rate, and audio channel of the media data into a type of attributes suitable for the media playing terminal.

Meanwhile, if the media conversion information extracted at step S300 is not of the type that is convertible by the media sharing apparatus at step S310, the media sharing apparatus generates a media transmission denial message and sends it to the media playing terminal at step S360.

As described above, the present invention is advantageous in that it enables previously converted media to be shared among homogeneous terminals when converting the attributes of media, such as a file format, a video codec, or an audio codec, to fit the characteristics of a media playing terminal, thus providing a media sharing service in which the conversion efficiency and use rate of media data are optimized.

Further, the present invention is advantageous in that previously converted media data can be directly provided to a media playing terminal without requiring a separate conversion procedure, thus enhancing the speed of provision of a media service.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A media sharing apparatus comprising:
   a terminal information management unit for, when a media playing terminal is connected thereto, requesting profile information from the connected media playing terminal, storing profile information, and managing profile information after the profile information is received from the media playing terminal;
   a media information management unit for determining whether to convert media data to be provided to the media playing terminal based on the profile information of the media playing terminal, and ascertaining media conversion information suitable for a type of the media playing terminal, wherein the media information management unit is configured to, if it is determined that the media data to be provided to the media playing terminal requires data conversion, perform a search to determine whether the media data suitable for the type of the media playing terminal or source media data is present among pieces of pre-stored media data;

a media conversion unit for converting the media data into data suitable for the type of the media playing terminal depending on a result of the determination by the media information management unit;

a storage unit separate from the media playing terminal to store a data set by the media sharing apparatus and to store the media data converted by the media sharing apparatus; and a data processing unit for providing at least one of media data suitable for the type of the media playing terminal and media data converted by the media conversion unit, to the media playing terminal, wherein the media data suitable for the type of the media playing terminal and the media data converted by the media conversion unit are either among the pieces of the pre-stored media data or from a service providing server.

2. The media sharing apparatus of claim 1, wherein the data processing unit is configured to, if neither media data suitable for the type of the media playing terminal nor source media data is present among the pieces of pre-stored media data, request media data from a service providing server that provides a media data service.

3. The media sharing apparatus of claim 1, wherein the media information management unit verifies whether the media data suitable for the type of the media playing terminal is of a type that is convertible by the media sharing apparatus.

4. The media sharing apparatus of claim 3, wherein the data processing unit is configured to, if it is verified by the media information management unit that the media data suitable for the type of the media playing terminal is not of the type that is convertible by the media sharing apparatus, generate a media transmission denial message and send the media transmission denial message to the media playing terminal.

5. The media sharing apparatus of claim 1, wherein the data processing unit is configured to, if it is determined by the media information management unit that the media data to be provided to the media playing terminal does not require data conversion, provide information of a service providing server that provides a media data service to the media playing terminal.

6. The media sharing apparatus of claim 1, wherein the profile information comprises at least one of screen size information of the media playing terminal, network information such as a bandwidth and a protocol of the media playing terminal, video information, audio information, and file format and resolution information of the media data.

7. A media sharing method comprising:

requesting profile information from a connected media playing terminal in response to a connection of the media playing terminal, storing profile information, and managing profile information after the profile information is received from the media playing terminal;

determining whether to convert media data based on the profile information of the media playing terminal, and ascertaining media conversion information suitable for a type of the media playing terminal if conversion of the media data is required, wherein ascertaining the media conversion information further comprises performing a search to determine whether the media data suitable for the type of the media playing terminal or source media data is present among pieces of pre-stored media data, based on the media conversion information;

storing a data set separately from the media playing terminal and storing the media data if conversion is required; and providing at least one of media data suitable for the type of the media playing terminal and media data converted into a type of data suitable for the type of the media playing terminal to the media playing terminal based on the media conversion information, wherein the media data suitable for the type of the media playing terminal and the media data converted are either among pieces of pre-stored media data or from a service providing server.

8. The media sharing method of claim 7, further comprising, if neither media data suitable for the type of the media playing terminal nor source media data is present among the pieces of pre-stored media data, requesting media data from a service providing server that provides a media data service.

9. The media sharing method of claim 7, further comprising converting at least one of the pre-stored media data and media data provided by a service providing server that provides a media data service into a type of data suitable for the type of the media playing terminal, based on the media conversion information at the ascertaining the media conversion information.

10. The media sharing method of claim 7, wherein the ascertaining the media conversion information comprises verifying whether the media data suitable for the type of the media playing terminal is of a type that is convertible by a relevant media sharing apparatus.

11. The media sharing method of claim 10, further comprising, if it is verified that the media data suitable for the type of the media playing terminal is not of the type that is convertible by the media sharing apparatus, generating a media transmission denial message and sending the media transmission denial message to the media playing terminal.

12. The media sharing method of claim 7, further comprising before the providing the media data, if it is determined that the media data to be provided to the media playing terminal does not require data conversion, providing information of a service providing server that provides a media data service to the media playing terminal.

13. The media sharing method of claim 7, wherein the profile information comprises at least one of screen size information of the media playing terminal, network information such as a bandwidth and a protocol of the media playing terminal, video information, audio information, and file format and resolution information of the media data.

* * * * *